United States Patent [19]

Schmidt

[11] Patent Number: 5,208,979
[45] Date of Patent: May 11, 1993

[54] PREFRACTURE LASER FORMATION OF A STRESS RISER GROOVE

[76] Inventor: Howard Schmidt, 8082 Woodview, Clarkston, Mich. 48016

[21] Appl. No.: 951,059

[22] Filed: Sep. 25, 1992

Related U.S. Application Data

[63] Continuation-in-part of Ser. No. 762,124, Sep. 19, 1991, abandoned.

[51] Int. Cl.$^5$ ............................................ B23P 17/00
[52] U.S. Cl. ..................... 29/888.09; 29/412; 29/413; 29/414; 29/416; 83/875; 225/2
[58] Field of Search ............ 29/888.09, 412, 413, 29/414, 416; 428/571, 572; 74/579 E; 225/2, 96, 100; 83/701, 875; 219/121.68, 121.69

[56] References Cited

U.S. PATENT DOCUMENTS

| | | |
|---|---|---|
| 1,630,759 | 5/1927 | Pierce . |
| 2,553,935 | 5/1951 | Parks . |
| 3,818,577 | 6/1974 | Bailey . |
| 3,994,054 | 11/1976 | Cuddon-Fletcher . |
| 4,224,101 | 9/1980 | T burg et al. ............... 29/413 |
| 4,355,457 | 10/1982 | Bartlett et al. ............. 29/413 |
| 4,569,109 | 2/1986 | Fetouh . |
| 4,665,607 | 5/1987 | Ressencourt . |
| 4,684,267 | 8/1987 | Fetouh . |
| 4,693,139 | 9/1987 | Mukai . |
| 4,970,783 | 11/1990 | Olaniron et al. ........... 29/888.09 |

Primary Examiner—Mark Rosenbaum
Assistant Examiner—David P. Bryant
Attorney, Agent, or Firm—Kenneth H. MacLean

[57] ABSTRACT

A method of manufacturing a multiple part component such as a connecting rod by integrally forming the connecting rod in one piece, laser cutting a stress riser along a surface of the connecting rod characterized by a deep and narrow groove and applying a tension force to separate the connecting rod into two parts, a main body and a bearing cap.

8 Claims, 1 Drawing Sheet

PREFRACTURE LASER FORMATION OF A STRESS RISER GROOVE

RELATED APPLICATIONS

This is a continuation-in-part of application Ser. No. 07/762,124, filed Sep. 19, 1991, now abandoned.

BACKGROUND OF THE INVENTION

1. Field of the Invention

This application concerns the manufacture of a multiple part metal component, such as a connecting rod, by the technique of fracturing an integral single part into multiple portions. The fracture is carried out by applying a tension force across a stress riser groove formed in the single part. The subject application concerns an improved stress riser groove which is formed by laser technology to produce a relatively narrow, deep and sharp V-shaped groove characterized by sharp corners which promotes crack initiation at relatively low tension force levels imposed on the single part.

2. Description of Related Art

The U.S. Pat. No. 3,818,577 to Bailey et al. discloses a connecting rod made essentially by the above identified cracking technique. In Bailey, the location of the crack and resultant fracture is determined by forming a brittle, heat treated frangible zone created by using electron beam bombardment as a localized heat treating process. The patent stipulates that the frangible zone is sufficient to successfully generate the crack. However, a stress concentrating notch circumscribing the frangible zone is also disclosed. The notch, shown in FIGS. 1 and 2, is shallow and wide and presumably is by broaching or other mechanical means, unlike the laser formed stress riser of the present application.

Other references which disclose grooves to initiate and localize a crack during the fracture technique are: U.S. Pat. Nos. 1,630,759; 2,553,935; and 4,693,139. The grooves disclosed in these prior art references are mechanically formed and are wide and shallow compared to the sharp, narrow and deep laser formed groove taught by the subject application.

SUMMARY OF THE INVENTION

This application concerns forming an improved stress riser groove in a single metal part or component of metal, usually steel. When a sufficient tension force is subsequently applied to the part, the stress riser groove initiates formation of a crack to produce a component of multiple parts. The fracturing operation is made easier (less tension force applied and less distortion of the part) if the edges or intersections of the groove surfaces are sharp (not rounded) and the groove is relatively narrow and deep. An improved laser formed stress riser groove is disclosed herein.

Therefore, an object or advantage of the subject laser formation of a stress riser groove is production of a relatively sharp, narrow and deep groove in a metal part, preferably of steel.

Another advantage of the subject laser technique for forming a narrow, deep and sharp stress riser groove is the resultant ease in fracturing a single component into pieces characterized by only a small tension force required to fracture the part as compared to the much larger forces necessary when a groove is formed mechanically, typically by broaching.

A still further advantage of the subject laser technique for forming a narrow, deep and sharp stress riser groove in a component such as the large bearing end of a steel connecting rod having a pair of spaced leg portions on either side of a cylindrical bearing bore is the much decreased tendency to distort the bore dimension from perfect roundness.

Still further objects and advantages of the subject laser formed stress riser groove in a single metal part to be subsequently fractured into two or more parts will be more apparent by a reading of the detailed description of a preferred embodiment, reference being made to the drawings thereof, as described hereafter.

IN THE DRAWING

FIG. 1 is a perspective view of a connecting rod showing the subject stress riser groove in the surface of a leg on the large bearing end portion; and FIG. 2 is a partial planar view of the large bearing end of a connecting rod with a prior art groove formed by mechanical means such as broaching or the like; and FIG. 2A is a greatly enlarged (8× view of the groove shown in FIG. 2; and FIG. 3 is a partial planar view of the large bearing end of the connecting rod with a laser formed stress riser groove; and FIG. 3A is a greatly enlarged (8×view of the laser formed groove shown in FIG. 3; and FIG. 4 is an end elevational view of the large bearing end of the connecting rod looking in the direction of arrow 4 in FIG. 3 and showing a laser delivery device inclined to the surface of the connecting rod in which the groove is desired.

DETAILED DESCRIPTION OF A PREFERRED EMBODIMENT

Figure 1:
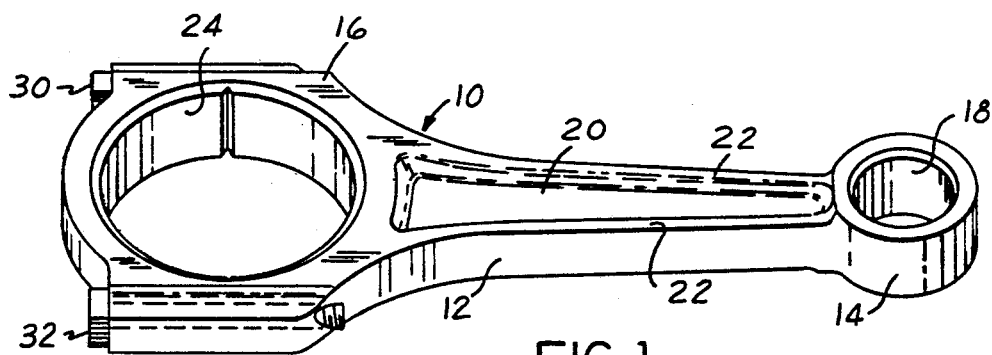

In FIG. 1, a connecting rod 10 for an internal combustion engine is illustrated. The connecting rod 10 is of fairly conventional design with an elongated midportion 12, a small bearing end portion 14 and a large end portion 16. The small end portion has a cylindrical shape with a bore 18 therethrough adapted to encircle a wrist or piston pin for pivotal connection to a piston (not shown). The midportion 12 has a thinned central wall 20 with thicker edge portions 22. This gives the midportion a light but very strong I-beam like structure. The large end portion 16 has a cylindrical shape with a cylindrical bore 24 therethrough adapted to encircle a crankshaft journal (not shown).

Note in the drawings that the connecting rod 10 is of one piece. Normally, the large end 16 and bearing bore 24 of a connecting rod has two parts, a main body portion of the connecting rod and by a removable bearing cap portion attached thereto. The removable bearing cap feature is necessary so that the connecting rod can be attached around the associated irregularly shaped crankshaft.

In the drawings, the one piece configuration of the connecting rod 10 is not the final stage of fabrication. Like a typical connecting rods as discussed above, the large end 16 must have a separable bearing cap structure. The subject connecting rod 10 is shown in one manufacturing stage prior to separation of the bearing cap end portion by a fracture process. The portion of the connecting rod to be separated to form the bearing cap is to the left in FIG. 1 and at the bottom of the rod in FIGS. 2 and 3.

Figure 3:
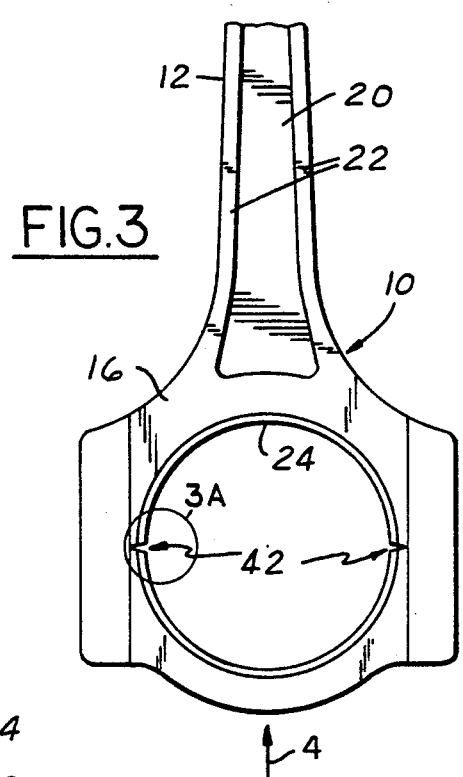
Figure 4:
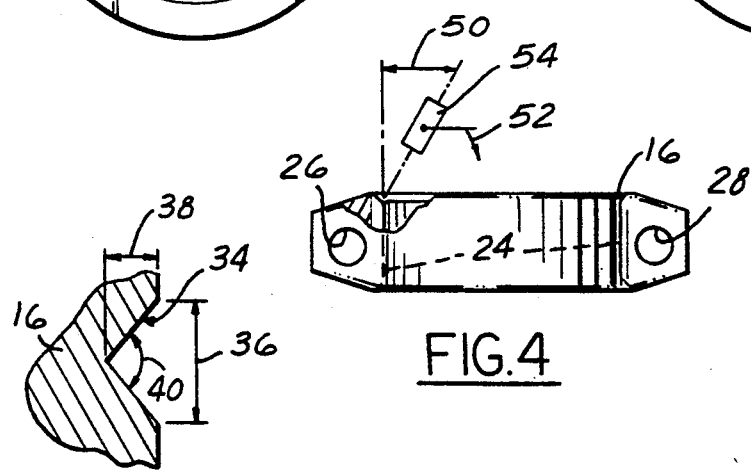

FIGS. 1 and 4 show a pair of elongated bores 26, 28 formed in the large end 16 of the rod 10 prior to the fracturing procedure. In FIG. 1, a pair of cap screws 30, 32 in bores 26, 28 are shown. The cap screws are not in place during the fracture separating process and so are not shown in FIGS. 3 and 4.

In a typical prior manufacturing process, the bearing cap is formed by sawing the large end in half to separate it into two parts. This removes metal and creates a non-cylindrical bearing bore 24. It is known to separate the rod into two parts by applying an internal expansion force within the bearing bore 24 to fracture the legs at either side of the bearing bore. To orient and initiate the crack and reduce the forces required to separate by the fracture method, it is common to provide a groove in one or more surfaces of the legs of the large end. The groove positions where the fracture crack starts and thus controls the fracture. Without a groove, greater forces are necessary to fracture the legs of the rod.

Figure 2:
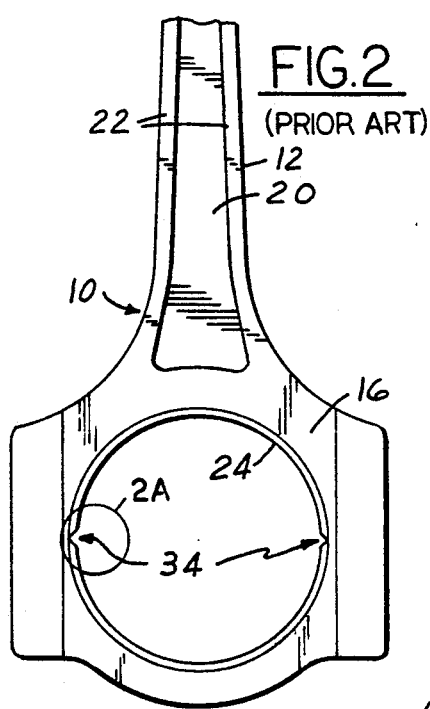

Thus, it is apparent that the stress riser groove is important in orienting the fracture crack and reducing forces needed for the fracture process. It can be understood that the configuration of the groove will be a factor in this operation. In FIGS. 2 and 2A, a typical mechanically formed groove 34 by a sharp (new) broaching tool is illustrated. Although a groove can be formed on all four sides of the pair of legs 16' and 16", it has been found that a single groove 34 on the inside surface 24' of the bearing surface is usually sufficient. Referring to FIG. 2A which is enlarged about eight times from FIG. 2, the groove 34 in circle 2A has a relatively wide and shallow V-shape. By actual measurement of test pieces, the narrowest width 36 and deepest depth 38 of a groove able to be formed by a sharp broach was about 1.0 mm wide by 0.4 mm deep. This formed an included angle 40 of greater than 100 degrees.

Figure 3A:
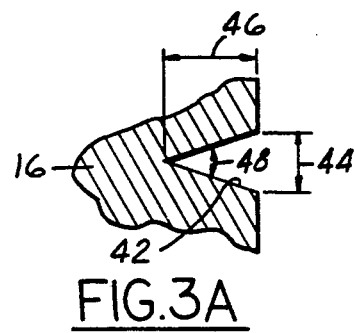

Illustrated in FIGS. 3 and 3A is a groove 42 typically formed by laser technology. Again the circled area in FIG. 3 is enlarged about eight times from FIG. 3 for comparison with the groove 34 in FIG. 2A. The groove 42 has a relatively narrow and deep V-shape. By measurement of test pieces, the width 44 and depth 36 of laser formed groove 42 is about 0.5 mm wide by 0.8 mm deep. This formed an included angle 48 of about 35 degrees. In addition, with laser formation, the sharpness of the intersections of the groove surfaces remain sharp as shown. With broach formation, the corners rather quickly become rounded due to tool wear.

SPECIFICS OF AN EMBODIMENT AND TEST RESULTS

Specifics

The above identified broached groove 34 and laser formed groove 42 have been formed in a compacted power metal connecting rod prepared and forged to a density of about 7.80 grams/cubic mm. The inside bores 24 were rough machined leaving about 0.63 mm extra material for subsequent machining clean-up. about 0.63 mm extra material for subsequent machining clean-up. The grooves 34 were formed using a sharp broach with a tip radius of 0.3 to 0.5 mm. The rod 10 weighs 0.53 kgs or 1.17 lbs (without cap screws) and is about 186 mm or about 7.3 inches long. The large end has a bearing bore with a diameter of about 50.8 mm. The cross-sectional area of each leg portion of the large end is about 274 sq. mm.

Test A

Several of the rods were grooved using both a new and a used broach. The new broach produced a groove with a width of about 1.0 mm and a depth of 0.4 mm. The duller broach produced a groove with a width of about 1.2 mm and a depth of 0.5 mm. Rods were also prepared grooves formed by a laser head 54 oriented at an angle 50 of 15 degrees to the surface 24' as shown in FIG. 4 and moving in the direction indicated by the arrowed line 52. The laser delivery head 54, schematically shown in FIG. 4, was a General Electric Research Nd: YAG face pumped laser. Scribing was done at a pulse rate of 10 Hz, a pulse width of 2.0 milli-seconds and a feed rate of 76 cm per minute. An energy level of about 400 watts energized the laser. Applicant believes that a YAG or $CO_2$ laser could also provide the desired sharp groove structure. The resultant groove by laser formation was 0.5 mm wide by 0.8 mm.

Fracturing of the connecting rods was carried out on an Ex-Cell-O Corporation connecting rod fracturing machine which applies a steady tension force along the length of the connecting rod until initiation of rod fractures starting at the stress riser groove. Tests of the above described rods revealed that a fracture tension force of between 83-111 kN was required to crack the broached rods (sharp to dull). A tension force of only about 33 kN was required to crack the laser scribed rods. Maximum distortion (out of roundness) was 0.64 mm (0.025 inches) for the broached rods and 0.005 mm (0.001 inches) for the laser processed rods.

Test B

Further test were conducted on the rods with laser formed stress risers. In this test, grooves were made by Lumonix LD-2 laser equipment. The resultant groove had a width of between 0.005 to 0.008 inches. The laser power was varied to produce various groove depths. The rods were fractured using a split mandrel and wedge fixture that fit the bore in the large end. A load was applied to the wedge until the rod fractured using a Tinius Olson test machine. The depth of the groove and necessary force applied to fracture the rod are as follows:

| DEPTH RANGE | FRACTURE LOAD RANGE |
| --- | --- |
| .030/.032" | 8000 lbs |
| .032/.034" | 7600–8000 lbs |
| .036/.038" | 5000 lbs |
| .040/.044" | 3500–4500 lbs |
| .044/.048" | 3800 lbs |
| .056/.056" | 3500 lbs |

It would appear the scribing to a depth greater than 0.050 inches offers little benefit in reducing the necessary fracture load. Further, it was determined that a rod scribed to a depth of only 0.005 inch could be successfully fractured with minimal bore distortion. However, the fracture force was substantially greater than for the 0.030 inch depth reported above. It would appear that a groove depth of between 0.040 to 0.050 inch would be desirable. With the resultant relatively low forces to fracture, very low levels of distortion were observed requiring only a minor finish boring operation.

Although only a single embodiment of the laser scribed connecting rod and process has been illustrated and described in detail, modifications are contemplated which would still be defined by the following claims which define the invention.

What is claimed is as follows:

1. A method of manufacturing a multiple part metal component by using a beam of a laser comprising the steps of integrally forming the respective parts of the multiple part component as a single piece of steel; machining the component to approximately final dimensions; focusing the laser beam at an oblique angle with respect to the surface of the component; energizing the laser and moving the focused beam in a direction parallel to the surface of the component to produce a linear stress riser groove; applying a sufficient tension force normal to the stress riser groove so as to fracture the component into its parts.

2. The method set forth in claim 1 in which the width and depth of the resultant laser cut groove is 0.5 mm and 0.8 mm respectively.

3. The method set forth in claim 1 in which the ratio of the width to the depth of the laser cut stress riser groove is about 5:8.

4. The method set forth in claim 1 wherein said laser is a pulsed type laser which is operated at about 400 watts with a pulse rate of about 10 Hz and a pulse width of about 2.0 milli-seconds, and the beam is moved at about 76 cm/minute.

5. A method of manufacturing a two part connecting rod for an engine by using a beam of a laser comprising the steps of: integrally forming the respective parts of the connecting rod as a single piece of steel with a substantially annularly shaped large end; machining the large end of the connecting rod to approximately final dimensions; focusing the laser beam at an oblique angle with respect to a surface of the large end; energizing the laser and moving the focused beam in a direction parallel to the surface to produce a linear stress riser groove in the surface; applying a sufficient tension force normal to the stress riser groove so as to fracture the large end into two parts, a main body and a bearing cap of the connecting rod, with a bearing formed therebetween.

6. The method set forth in claim 5 in which the width and depth of the resultant laser cut groove is 0.5 mm and 0.8 mm respectively.

7. The method set forth in claim 5 in which the ratio of the width to the depth of the laser cut stress riser groove is about 5:8.

8. The method set forth in claim 5 wherein said laser is a pulsed laser which is operated at about 400 watts, with a pulse rate of about 10 Hz and a pulse width of about 2.0 milli-seconds, and the beam is moved at about 76 cm/minute.

* * * * *

UNITED STATES PATENT AND TRADEMARK OFFICE
CERTIFICATE OF CORRECTION

PATENT NO. : 5,208,979
DATED : May 11, 1993
INVENTOR(S) : H. Schmidt

It is certified that error appears in the above-indentified patent and that said Letters Patent is hereby corrected as shown below:

ON THE TITLE PAGE, in Assignee block #73, insert --Chrysler Corporation--

Signed and Sealed this

Twenty-first Day of June, 1994

Attest:

BRUCE LEHMAN

*Attesting Officer*  *Commissioner of Patents and Trademarks*